(12) United States Patent
Kim

(10) Patent No.: US 6,285,142 B1
(45) Date of Patent: Sep. 4, 2001

(54) DISPLAY APPARATUS HAVING A HORIZONTAL SCREEN SIZE ADJUSTING CIRCUIT IN STEP-UP TYPE

(75) Inventor: Eun-Sup Kim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/199,189

(22) Filed: Nov. 25, 1998

(30) Foreign Application Priority Data

Nov. 25, 1997 (KR) ............................................. 97-33882 U

(51) Int. Cl.[7] ................................. G09G 1/04; H01J 29/70
(52) U.S. Cl. ............................................. 315/371; 315/411
(58) Field of Search ..................................... 315/371, 408, 315/411, 399; 348/747, 581, 556, 704

(56) References Cited

U.S. PATENT DOCUMENTS

| | | | |
|---|---|---|---|
| 4,318,036 * | 3/1982 | Bart et al. | 315/408 |
| 4,385,263 * | 5/1983 | Luz et al. | 315/411 |
| 5,021,719 * | 6/1991 | Arai et al. | 315/364 |
| 5,059,874 * | 10/1991 | Oliver | 315/411 |
| 5,113,122 * | 5/1992 | Bando et al. | 315/371 |
| 5,216,412 * | 6/1993 | Gawell et al. | 340/720 |
| 5,466,993 * | 11/1995 | Leaver | 315/411 |
| 5,469,029 * | 11/1995 | Jackson et al. | 315/408 |
| 5,504,521 * | 4/1996 | Webb et al. | 348/180 |
| 5,627,437 * | 5/1997 | Kim | 315/399 |
| 5,714,849 * | 2/1998 | Lee | 315/408 |
| 5,717,296 * | 2/1998 | Onozawa et al. | 315/371 |
| 5,831,398 * | 11/1998 | Kim | 315/371 |
| 5,898,467 * | 4/1999 | Woo | 348/806 |
| 6,011,593 * | 1/2000 | Onozawa et al. | 348/556 |
| 6,020,694 * | 2/2000 | Shim | 315/387 |

FOREIGN PATENT DOCUMENTS

410341356A * 12/1998 (JP) ............................. H04N/3/223

* cited by examiner

*Primary Examiner*—Seungsook Ham
*Assistant Examiner*—Shun Lee
(74) *Attorney, Agent, or Firm*—Robert E. Bushnell, Esq.

(57) ABSTRACT

A display apparatus of multi-mode cathode ray tube is disclosed which is capable of enlarging a horizontal screen size by adjusting a size of the horizontal screen by employing a step-up type without occurrence of additional power consumption or a double trigger phenomenon. The apparatus includes a horizontal screen size adjusting circuit in step-up type including a horizontal screen size adjusting unit being driven by an output signal of a pulse width modulation signal generating unit which generates and outputs a pulse width modulation signal in accordance with an applied horizontal screen size control signal, and generating and outputting a current which adjusts a horizontal screen size; a horizontal output circuit being driven by an output signal of a horizontal driving circuit which is driven by a horizontal oscillation frequency, and supplying a current inputted from the horizontal screen size adjusting unit to a horizontal deflection coil; a horizontal deflection coil for receiving the current from the horizontal outputting circuit to horizontally deflect an electron beam: and a S-shaped correction condenser being connected in serial to the horizontal deflection coil and correcting a linearity of picture displayed on a screen.

30 Claims, 5 Drawing Sheets

US 6,285,142 B1

DISPLAY APPARATUS HAVING A HORIZONTAL SCREEN SIZE ADJUSTING CIRCUIT IN STEP-UP TYPE

CLAIM OF PRIORITY

This application makes reference to, incorporates the same herein, and claims all benefits accruing under 35 U.S.C. §119 from an application entitled DISPLAY APPARATUS POSSESSING THE STEP-UP CIRCUIT OF CONTROL LING HORIGONTAL SIZE earlier filed in the Korean Industrial Property Office on Nov. 25, 1997, and there duly assigned Ser. No. 97-33882, a copy of which is annexed hereto.

BACKGROUND OF THE INVENTION

1. Technical Field

The present invention relates to a display apparatus of a cathode ray tube, and more particularly to a display apparatus of multi-mode cathode ray tube which is capable of enlarging a horizontal screen size without additional power consumption or a double trigger phenomenon.

2. Related Art

Generally, a display apparatus of a cathode ray tube includes a horizontal deflection circuit for deflecting an electron beam discharged from electron gun of the cathode ray tube (CRT) to right and left side of a screen, and the horizontal deflection circuit has a function that a user arbitrarily can enlarge or reduce the size of the horizontal screen.

In addition, as to the display apparatus of the multi-mode cathode ray tube which is able to accomplish a plurality of deflection frequencies, the screen size become smaller as an operating deflection frequency is higher, causing an inconvenience in a user's viewing.

Accordingly, in case that the operating frequency is higher, the user feels a necessity for the reduced screen to be enlarged, and for this reason, an importance for the horizontal screen size adjusting circuit is being increased.

I have found that there is a need for horizontal screen size adjusting circuit that does not require additional power consumption and that does not involve a double trigger phenomenon.

SUMMARY OF THE INVENTION

Objects of the present invention include providing a display apparatus having a horizontal screen size adjusting circuit in step-up type which is capable of increasing a horizontal screen size without an additional power consumption or a double trigger phenomenon occurring, even in a case that a horizontal deflection frequency is increased for accomplishing a high resolution.

In order to attain the above objects and others, there is provided a display apparatus having a horizontal screen size adjusting circuit in step-up type including a horizontal screen size adjusting unit being driven by an output signal of a pulse width modulation signal generating unit which generates and outputs a pulse width modulation signal in accordance with an applied horizontal screen size control signal, and generating and outputting a current which adjusts a horizontal screen size; a horizontal output circuit being driven by an output signal of a horizontal driving circuit which is driven by a horizontal oscillation frequency, and supplying a current inputted from the horizontal screen size adjusting unit to a horizontal deflection coil; a horizontal deflection coil for receiving the current from the horizontal outputting circuit to horizontally deflect an electron beam; and a S-shaped correction condenser being connected in serial to the horizontal deflection coil and correcting a linearity of picture displayed on a screen.

To achieve these and other objects in accordance with the principles of the present invention, as embodied and broadly described, the present invention provides an apparatus, comprising: a video display conveying varying visual information to a user, said video display forming a screen having a vertical screen size and a horizontal screen size, said visual information appearing on said screen, and said video display including an electron gun emitting a beam of electrons; a pulse width modulation signal generating unit receiving a horizontal screen size adjusting signal and accordingly generating a pulse width modulation signal, said pulse width modulation signal generating unit outputting said pulse width modulation signal; a horizontal screen size adjusting unit being driven by said pulse width modulation signal and generating a current including a first signal adjusting said horizontal screen size in accordance with a step-up type, said horizontal screen size adjusting unit outputting said current; a horizontal driving circuit being driven by a horizontal oscillation frequency signal and generating a second signal; a horizontal outputting circuit having a switch, said horizontal outputting circuit receiving said current from said horizontal screen size adjusting unit and said second signal, said second signal interrupting said switch, and said horizontal outputting circuit outputting said current; a horizontal deflection inductor receiving said current from said horizontal outputting circuit and said beam of electrons from said electron gun of said video display, said horizontal deflection inductor horizontally deflecting said electron beam in accordance with said current; and a capacitor being coupled in series to said horizontal deflection inductor, said capacitor correcting a linearity of said screen.

To achieve these and other objects in accordance with the principles of the present invention, as embodied and broadly described, the present invention provides an apparatus, comprising: a video display conveying varying visual information to a user, said video display forming a screen having a vertical screen size and a horizontal screen size, said visual information appearing on said screen, and said video display including an electron gun emitting a beam of electrons; a first unit receiving a first signal, generating a second signal in accordance with said first signal, and outputting said second signal, wherein said first signal corresponds to a horizontal screen size adjusting signal and said second signal corresponds to a pulse width modulation signal; a second unit receiving said second signal from said first unit, said second unit being driven by said second signal, said second unit outputting a first current including a third signal to adjust said horizontal screen size in accordance with a step-up type; a third unit receiving a fourth signal and generating a fifth signal, said fourth signal corresponding to a horizontal oscillation frequency signal; a fourth unit having a switch selectively turning said fourth unit on and off, said fourth unit receiving current from said second unit, said fourth unit receiving said fifth signal from said third unit, said fifth signal switching said switch, said fourth unit discharging a high voltage when said fourth unit is turned off in accordance with said fifth signal; a fifth unit receiving current from said fourth unit and receiving said beam of electrons from said electron gun of said video display, said fifth unit horizontally deflecting said electron beam in accordance with current received from said fourth unit, said fifth unit forming said high voltage, said high voltage of said fifth unit being discharged by said fourth unit when said fourth unit is turned off, and a sixth unit being coupled in series to said fifth unit, said sixth unit correcting a linearity of said screen, said sixth unit forming said high voltage, said high voltage of said sixth unit being discharged by said fourth unit when said fourth unit is turned off; and wherein said second unit further comprises: a seventh unit being driven by said second signal received from said first unit, said seventh unit outputting a sixth signal; a eighth unit receiving said sixth signal, said eighth unit amplifying current in accordance with said sixth signal, said eighth unit receiving a voltage from a power source; a ninth unit adjusting said horizontal screen size in accordance with current supplied through said eighth unit; and a step-up converting unit maintaining a back electromotive force generated at said ninth unit.

To achieve these and other objects in accordance with the principles of the present invention, as embodied and broadly described, the present invention provides a method, comprising: conveying varying visual information to a user utilizing a video display forming a screen having a vertical screen size and a horizontal screen size, said visual information appearing on said screen, and said video display including an electron gun emitting a beam of electrons; receiving a horizontal screen size adjusting signal and generating a pulse width modulation signal in accordance with said horizontal screen size adjusting signal; receiving said pulse width modulation signal and generating a first current including a first signal adjusting said horizontal screen size in accordance with a step-up type, said generating of said first current being performed by a horizontal screen size adjusting unit; receiving a horizontal oscillation frequency signal and generating a second signal; receiving said first current from said horizontal screen size adjusting unit and receiving said second signal, and outputting a second current in accordance with said second signal, said second current corresponding to said first current, said first current being received from said horizontal screen size adjusting unit by a horizontal outputting circuit having a switch selectively turning said horizontal outputting circuit on and off; receiving said second current and said beam of electrons from said electron gun of said video display, and horizontally deflecting said electron beam in accordance with said second current, said deflecting being performed by an inductor; and correcting a linearity of said screen, said correcting being performed by a correcting unit disposed between said inductor and a reference potential.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
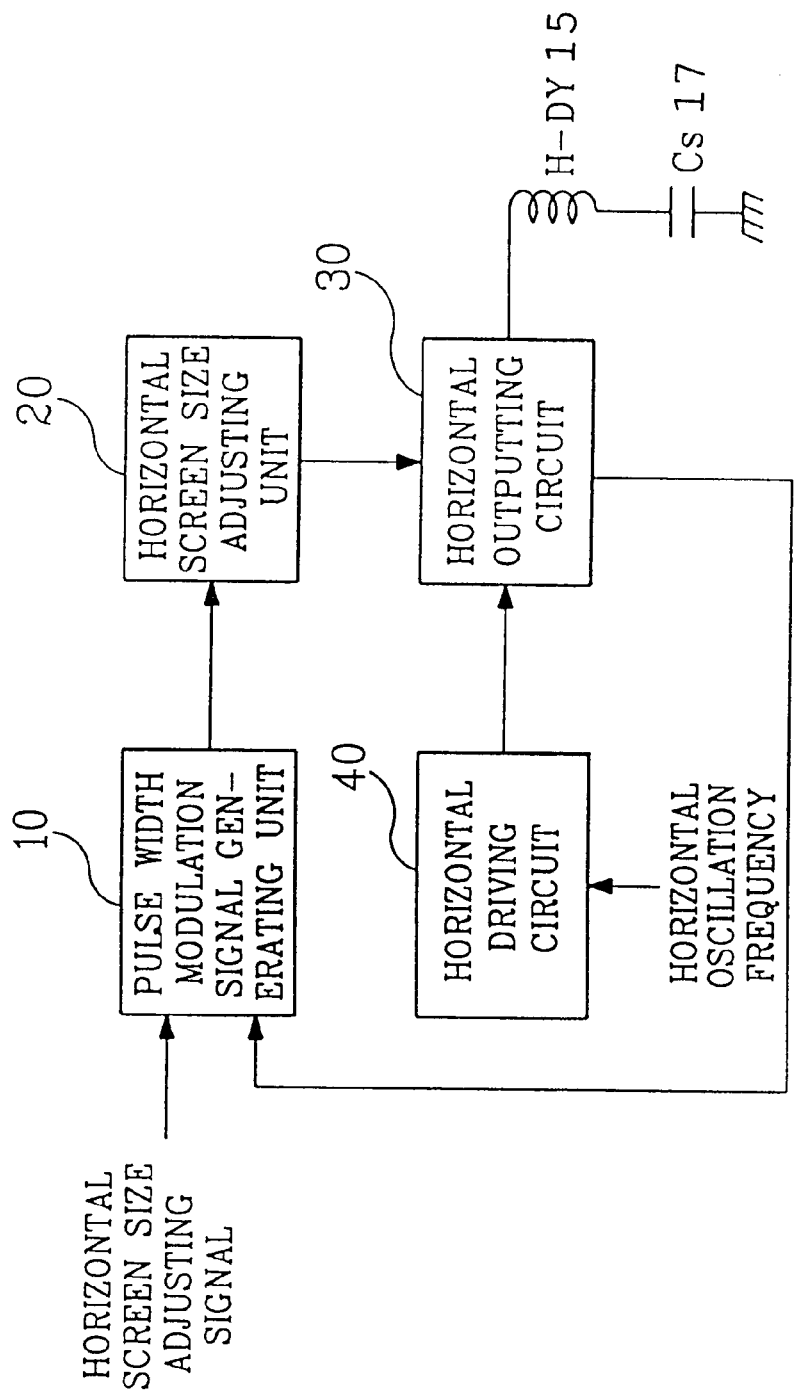
FIG. 1 is a schematic block diagram illustrating a horizontal deflection circuit of a cathode ray tube display apparatus having a horizontal screen size adjusting circuit.

Turn now to FIG. 1, which is a schematic block diagram illustrating a horizontal deflection circuit of a cathode ray tube display apparatus having a horizontal screen size adjusting circuit. As shown in FIG. 1, the horizontal deflection circuit of the cathode ray tube having the horizontal screen size adjusting circuit includes a pulse width modulation signal generating unit 10 to which a horizontal screen size adjusting signal is applied, a horizontal screen size adjusting unit 20 for receiving an output signal of the pulse width modulation signal generating unit 10, a horizontal driving circuit 40 for receiving a horizontal oscillating frequency, a horizontal outputting circuit 30 for receiving the output signal of the horizontal driving circuit 40 and the horizontal screen size adjusting unit 20, a horizontal deflection coil H-DY 15 being connected in serial to the horizontal outputting circuit 30 so as to receive the output current of the horizontal outputting unit 30, and a condenser Cs 17 being connected in serial to the horizontal deflection coil H-DY 15.

The current flowing to the horizontal outputting circuit 30 is detected and is outputted back to the pulse width modulation signal generating unit 10 as a feedback signal. An operation of the horizontal deflection circuit of the cathode ray tube display apparatus having the horizontal screen size adjusting circuit of FIG. 1 as constructed above will now be described.

First, after receiving a horizontal screen size adjusting signal, the pulse width modulating signal generating unit 10 generates a pulse width modulation signal and outputs it to the horizontal screen size adjusting unit 20, the horizontal screen size adjusting unit 20 is driven by the input pulse width modulation signal and supplies a current including a signal for adjusting the horizontal screen size to the horizontal outputting circuit 30.

The horizontal driving circuit 40 is driven by the horizontal oscillation frequency and generates a signal for interrupting a switching device of the horizontal outputting circuit 30. The horizontal outputting circuit 30 which is receiving the signal outputted from the horizontal driving circuit 40 supplies the current inputted from the horizontal screen size adjusting unit 20 to the horizontal deflection coil H-DY 15.

The horizontal deflection coil H-DY 15 which receives the current from the horizontal outputting circuit 30 renders the electron beam discharged from the electron gun of the cathode ray tube to be horizontal-deflected right and left. Meanwhile, an S-shaped correction condenser Cs 17 which is connected in serial to the horizontal deflection coil H-DY 15 serves to correct a linearity of outer part of right and left side and central part of the picture displayed on the screen. The output current of the horizontal output circuit 30 is detected as a feedback signal and then is applied to the pulse width modulation signal generating unit 10 as a control signal, so as to maintain the current flowing at the horizontal deflection coil H-DY 15 within a suitable limit.

Figure 2:
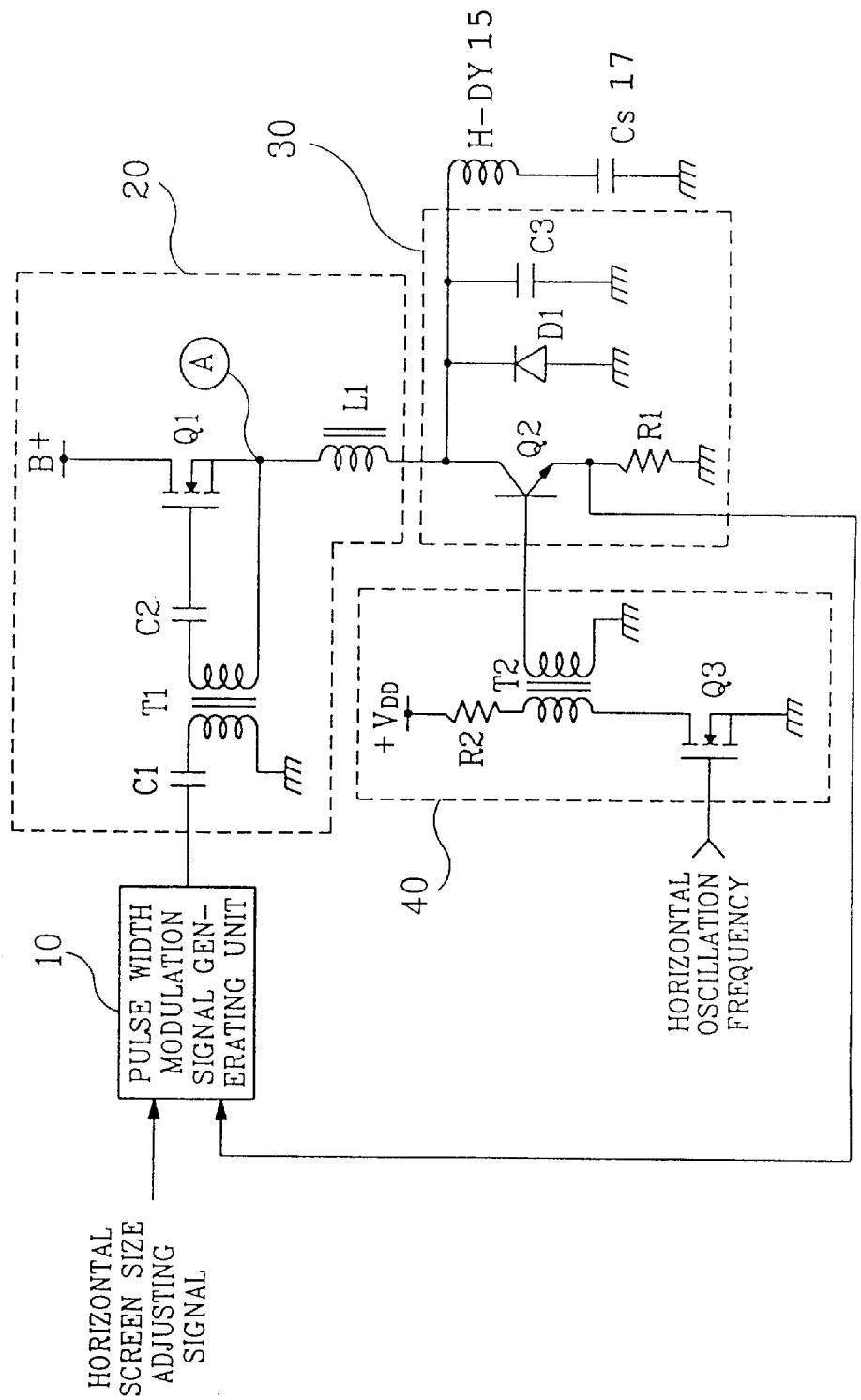
FIG. 2 shows a detailed circuit diagram of one embodiment of FIG. 1, in accordance with the principles of the present invention.

Turn now to FIG. 2, which is a detailed circuit diagram of one embodiment of FIG. 1. The embodiment shown in FIG. 2 is generally known as a step-down type having the following construction. An output terminal of the pulse width modulation signal generating unit 10 to which the horizontal screen size adjusting signal is applied to an input terminal at one end thereof is connected to the other end of a first coil of a voltage and current matching transformer of which one end is grounded through a waveform shaping condenser C1.

In FIG. 2, a second output terminal of the voltage and current matching transformer T1 is connected to a gate of a field effect transistor (FET) Q1 through another waveform shaping condenser C2. A high voltage power source B+ is connected to a drain of the field effect transistor Q1, and one end of the horizontal deflection coil H-DY 15 and a collector of the horizontal output transistor Q2 are connected to a source of the field effect transistor Q1 through the horizontal screen size adjusting coil L1, while the S-shaped correction condenser Cs 17 of which one end is grounded is connected to the other end of the horizontal deflection coil H-DY 15.

In FIG. 2, the collector of the horizontal output transistor Q2 is connected to the other end of a resonance condenser C3 of which one end is grounded with a cathode of a damping diode D1 with which an anode is grounded. A current detection resistance R1 of which one is grounded is connected in serial to the emitter of the horizontal output transistor Q2. The horizontal oscillating frequency is inputted to the gate of the field effect transistor Q3 with which the source of the horizontal driving circuit 40 is grounded, and the drain of the field effect transistor Q3 is connected to a predetermined power source +VDD through a current limit resistance R2 and the first coil of the horizontal driving transformer T2.

The base of the horizontal output transistor Q2 is connected to the other end of the second coil of the horizontal driving transformer T2 of which one end is grounded, and the contacting point of the emitter of the horizontal output transistor Q2 and the current detecting resistance R1 is connected to a control input terminal of the pulse width modulation signal generating unit 10.

An operation of the detailed circuit diagram of the horizontal deflection circuit of the cathode ray tube display apparatus having a horizontal screen size adjusting circuit of FIG. 2 will now be described. When a horizontal screen size adjusting signal is applied to the pulse width modulation signal generating unit 10, the pulse width modulation signal generating unit 10 is actuated so that a pulse width modulated signal is outputted through an output terminal, which excites the matching transformer T1, and the pulse-type voltage accumulated at the second coil of the transformer T1 actuates the field effect transistor Q1.

Accordingly, the current is supplied from the high voltage power source B+ to the deflection coil, H-DY 15 and the S-shaped correction condenser Cs 17 through the horizontal screen size adjusting coil L1 so as to be charged. In this condition, the field effect transistor Q3 is turned on by a high potential level of the horizontal oscillation frequency in pulse type, and when the first coil of the horizontal driving transformer T2 is excited, a voltage is accumulated at the second coil of the horizontal driving transformer T2.

Accordingly, a bias voltage is applied to the base of the horizontal output transistor Q2 of the horizontal output circuit 30 so as to be turned on, by which the high voltage charged at the horizontal deflection coil H-DY 15 and the S-shaped correction condenser C2 17 is discharged. At this state, when the horizontal oscillating frequency is changed to a low potential level, the field effect transistor Q3 of the horizontal driving circuit 40 is turned off, according to which the bias voltage is not applied to the base of the horizontal output transistor Q2 of the horizontal output circuit 30, so that the horizontal output transistor Q2 is turned off.

Therefore, the high voltage power source B+ flowing through the field effect transistor Q1 of the horizontal screen size adjusting unit 20 is charged again at the horizontal deflection coil H-DY 15 and the S-shaped correction condenser Cs 17 through the horizontal screen size adjusting coil L1, and the above-described operation is repeated.

In this respect, the horizontal deflection coil H-DY 15 signifies a coil for horizontally deflecting the electron beam mounted at a neck of the cathode ray tube display apparatus (not shown), to which when a current flows, the electron beam is deflected right and left according to the direction of the flowing current.

The condenser Cs 17 connected in serial to the horizontal deflection coil H-DY 15 is the S-shaped correction condenser, serving to apply parabola voltage to the horizontal deflection coil H-DY 15. In addition, it corrects the linearity of outer part of right and left side and central part of the screen of the cathode ray tube display apparatus, and cuts off a flowing of a direct current (DC) to the horizontal deflection coil H-DY 15.

The potential of the 'A' node at the horizontal deflection circuit of the cathode ray tube display apparatus having the horizontal screen size adjusting circuit of FIG. 2 operated as described above is determined by a width of on-duty pulse width modulator on-duty (PWMon-duty) among output waveform of the pulse width modulation signal generating unit 10.

That is, if the voltage step-down between the drain and the source of the field effect transistor Q1 is neglected, the potential of 'A' node would be approximately $(B+) \times (PWMon\text{-}duty[\%]/100[Vrms])$.

Meanwhile, for preventing a double trigger phenomenon of the screen, a horizontal retrace time should be less than off-time of the output waveform of the pulse width modulation signal generating unit 10. That is, the coverage for using the on-duty of the output waveform of the pulse width modulation signal generating unit 10 should be that (1 cycle of the pulse width modulation signal–on-duty time period) >horizontal retrace time=off-duty time period of the pulse width modulation signal>horizontal retrace time, in the pulse width modulation signal generating unit 10.

In this respect, the cycle of the pulse width modulation signal, which is the output waveform of the pulse width modulation signal generating unit 10, is outputted by being synchronously triggered with the horizontal frequency, and as to the potential [Vrms] of the 'A' node, it requires higher potential as the horizontal frequency becomes high. As a result, in order to heighten the horizontal deflection frequency for accomplishing high resolution, the potential of 'A' node needs to be high, which causes an increase in power consumption.

For this purpose, the methods are proposed that the on-duty of the pulse width modulation signal outputted from the pulse width modulation signal generating unit 10 should be increased, the power source voltage B+ of the horizontal screen size adjusting unit 20 should be increased, or a high-sensitive horizontal deflection coil H-DY 15 should be used.

However, these methods have disadvantages in that, first, when the on-duty of the pulse width modulation signal outputted from the pulse width modulation signal generating unit 10 is increased, a double trigger phenomenon occurs, causing shaking of screen or overlapping of edge of picture; secondly, in order to heighten the power source voltage B+ of the horizontal screen size adjusting unit 20, it is necessary to employ components which may have much power allowance at the horizontal screen size adjusting unit 20 or at the horizontal outputting circuit 30 so that a circuit stress due to the supplied power can be reduced, which, however, causes an increase of production cost by using expensive circuit devices. In addition, the method of using the high sensitive horizontal deflection coil H-DY 15 includes a cause of increase of production cost.

A preferred embodiment of the present invention will now be described with reference to the accompanying drawings. Refer now to FIG. 1, which is a schematic block diagram illustrating a horizontal deflection circuit of a cathode ray tube display apparatus having a horizontal screen size adjusting circuit, which shows a construction having some similarities with that of the present invention. Differences between the FIG. 1 and the present invention include the construction of the horizontal screen size adjusting unit 20.

Figure 3:
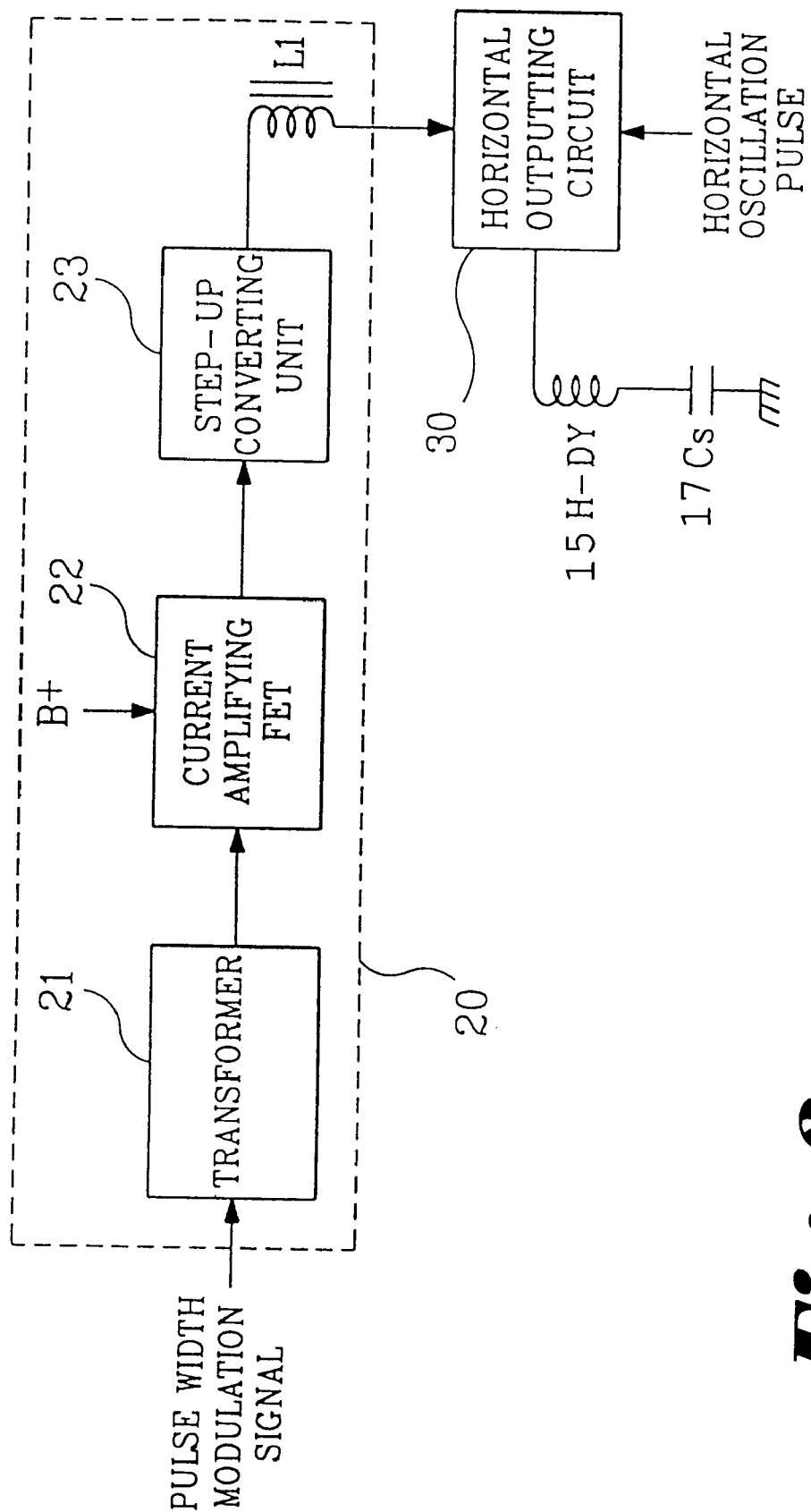
FIG. 3 is a detailed block diagram illustrating one embodiment of a horizontal screen size adjusting unit and a horizontal outputting circuit of FIG. 1, in accordance with the principles of the present invention.

Turn now to FIG. 3, which is a detailed block diagram illustrating one embodiment of a horizontal screen size adjusting unit and a horizontal outputting circuit of FIG. 1, in accordance with the principles of the present invention. In other words, FIG. 3, is a detailed block diagram illustrating one embodiment of a horizontal screen size adjusting unit 20 and a horizontal outputting circuit 30, in accordance with the principles of the present invention.

As shown in FIG. 3, the horizontal screen size adjusting unit 20 having a horizontal screen size adjusting circuit with a step-up type in accordance with the present invention includes a step-up converting unit 23 between a current amplifying field effect transistor (FET) 22 and a horizontal screen size adjusting coil L1, of which operation is as follows.

In FIG. 3, a pulse width modulation signal provided from an output terminal of a pulse width modulation signal generating unit, shown as feature 10 in FIG. 1, to a horizontal screen size adjusting unit 20 excites a matching transformer 21, and the voltage in pulse type accumulated to the output terminal of the transformer 21 actuates a current amplifying field effect transistor 22.

In FIG. 3, accordingly, the current flows from the high voltage power source B+ to the deflection coil H-DY 15 and the S-shaped correction condenser Cs 17 through the step-up converting unit 23 and the horizontal screen size adjusting coil L1 so as to be charged. At this state, in case that a horizontal driving pulse which is the output signal of the horizontal driving circuit (corresponding to feature 40 of FIG. 1) (not shown) is high potential level, when the horizontal outputting circuit 30 is turned on, the high voltage charged at the horizontal deflection coil H-DY 15 and the S-shaped correction condenser Cs 17 is discharged.

At this state, when the horizontal driving pulse is changed to a low potential level, the horizontal outputting circuit 30 is turned off. And, at this time, the high voltage power source B+ flowing through the current amplifying field effect transistor 22 of the horizontal screen size adjusting unit 20 is again charged at the horizontal deflection coil H-DY 15 and the S-shaped correction condenser Cs 17 through the step-up converting unit 23 and the horizontal screen size adjusting coil L1, and these operations are repeated.

Figure 4:
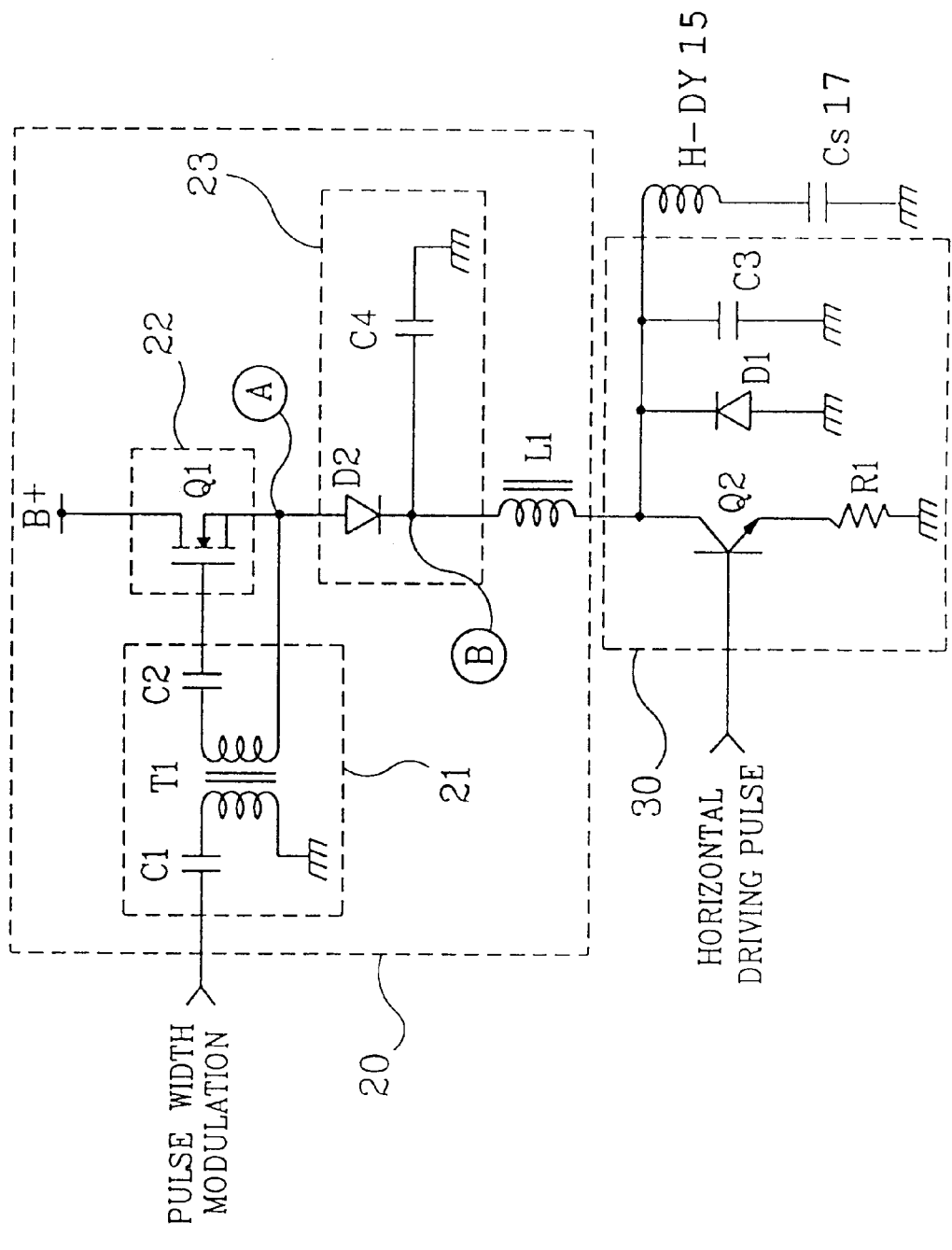
FIG. 4 is a detailed circuit diagram illustrating one embodiment of FIG. 3, in accordance with the principles of the present invention.

Turn now to FIG. 4, which is a detailed circuit diagram illustrating one embodiment of FIG. 3, in accordance with the principles of the present invention. FIG. 4 is a detailed circuit diagram showing one embodiment of FIG. 3 which has the same construction as that of FIG. 2 except that the step-up converting unit 23 is connected in serial between the current amplifying field effect transistor 22 and the horizontal screen size adjusting coil L1.

Thus, while describing FIG. 4, an explanation for the same construction as that of FIG. 2 shall be omitted and only relevant elements and their operational characteristics will be described. As shown in FIG. 4, the step-up converting unit 23 serves to maintain back electromotive force which is generated at the horizontal screen size adjusting coil L1, for which it includes a backward current cutting-off means for preventing the current from flowing backward due to the back electromotive force generated at one end of the horizontal screen size adjusting coil L1, and a charging unit for preventing a surge current due to the back electromotive force generated at one end of the horizontal screen size adjusting coil L1 and smoothing the back electromotive force.

Figure 5:
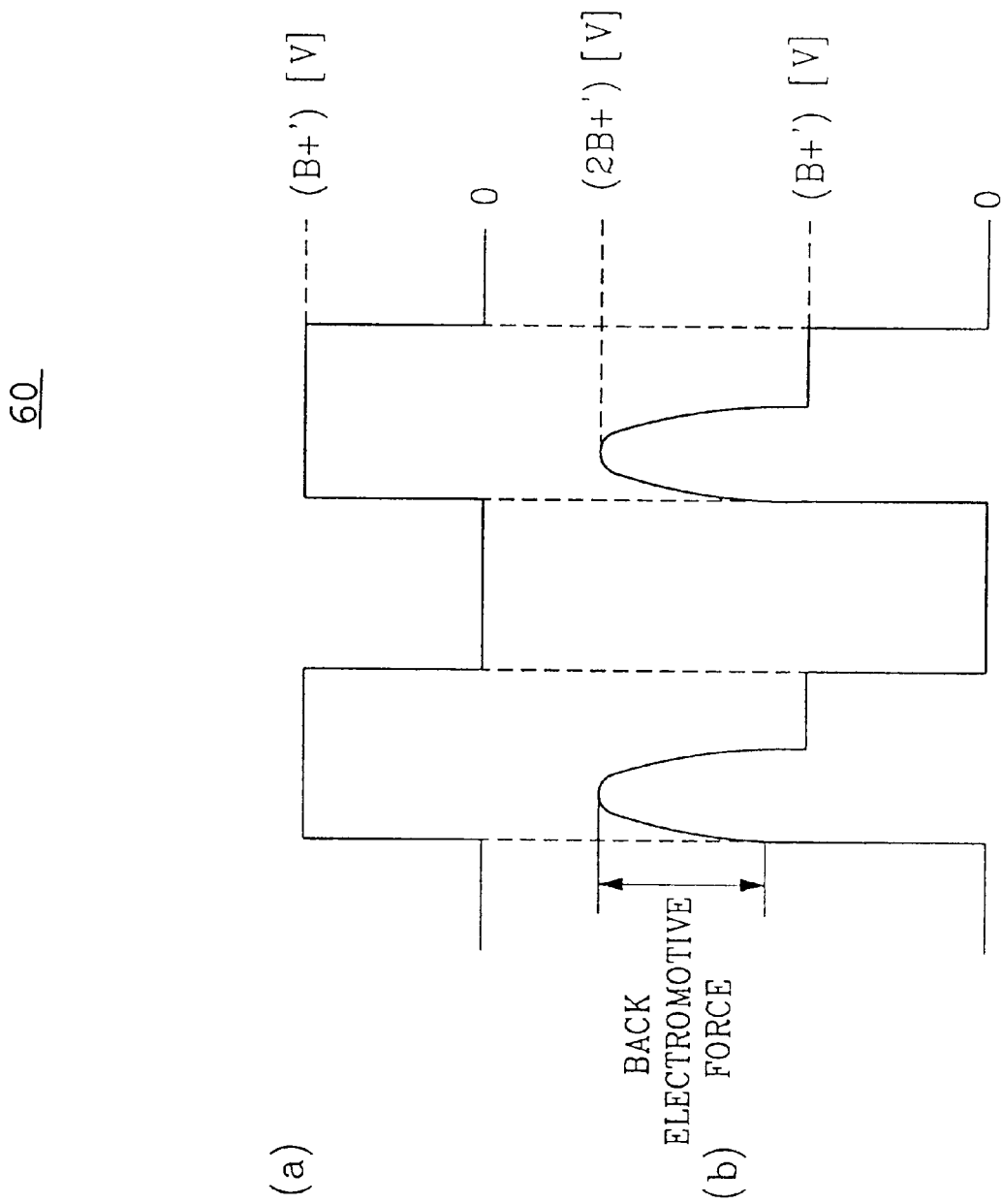
FIG. 5 shows waveform of each end of a step-up converting unit of FIG. 3 in an operation of a display apparatus having a horizontal screen size adjusting circuit with a step-up type, in accordance with the principles of the present invention.

In FIG. 4, as the backward current cutting-off means, a diode D2, which is a circuit means that flows the current only in one direction, and a condenser C4 is used as the charging means. An operation of the display apparatus having the horizontal screen size adjusting circuit in step-up type having step-up converting unit 23 is as follows, in which FIG. 5 is a waveform of the operation. Refer now to FIG. 5, which shows a waveform 60 of each end of a step-up converting unit of FIG. 3 in an operation of a display apparatus having a horizontal screen size adjusting circuit with a step-up type, in accordance with the principles of the present invention.

First, a potential B+ of the 'A' node is the same as the potential of 'A' node (FIG. 5a) at the horizontal deflection circuit of the cathode ray tube display apparatus having the horizontal screen size adjusting circuit as described above regarding FIG. 2. That is, it is determined by the width of the (PWMon-duty) of the output waveform of the pulse width modulation signal generating unit 10. If the voltage step-down between the drain and source of the current amplifying field effect transistor Q1 22 is neglected, the potential of the 'A' node is approximately (B+)×(PWMon-duty[%]/100/ [Vrms].

However, the potential of 'B' node becomes double (2B+) that of 'A' node because the back electromotive force at the horizontal screen size adjusting coil L1 is added to the potential (B+) of the 'A' node (FIG. 5b). In this respect, the diode D2, that is the backward current cutting-off means, serves to prevent the current due to the back electromotive force generated at the horizontal screen size adjusting coil L1 from flowing backward to the current amplifying field effect transistor 22, while the condenser C4 serves to prevent a surge current due to the back electromotive force generated at the horizontal screen size adjusting coil L1 and smooth the back electromotive force.

Therefore, as to the display apparatus having the horizontal screen size adjusting circuit in step-up type, even when the horizontal deflection frequency for accomplishing the high resolution is increased, the potential of 'B' node can be used without necessity of additional power consumption.

As so far described, according to the display apparatus having the horizontal screen size adjusting circuit in step-up type in accordance with the present invention, the horizontal screen size can be increased without necessity of additional power consumption which would cause the double trigger phenomenon and increase of production cost when the horizontal deflection frequency is increased to accomplish high resolution.

The foregoing paragraphs describe the details of a display apparatus of cathode ray tube, and more particularly a display apparatus of multi-mode cathode ray tube which is capable of enlarging a horizontal screen size by adjusting a size of the horizontal screen by employing a step-up type without occurrence of additional power consumption or a double trigger phenomenon. The display apparatus is not limited to cathode ray tube display units. The display apparatus can include other types of display units, in accordance with the principles of the present invention.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
    a video display conveying varying visual information to a user, said video display forming a screen having a vertical screen size and a horizontal screen size, said visual information appearing on said screen, and said video display including an electron gun emitting a beam of electrons;
    a pulse width modulation signal generating unit receiving a horizontal screen size adjusting signal and a feedback signal, and accordingly generating a pulse width modulation signal, said pulse width modulation signal generating unit outputting said pulse width modulation signal;
    a horizontal screen size adjusting unit being driven by said pulse width modulation signal and generating a first signal adjusting said horizontal screen size in accordance with a step-up type, said horizontal screen size adjusting unit comprising:
        a matching transformer having an input terminal, a first output terminal, and a second output terminal, said input terminal receiving said pulse width modulation signal;
        a first transistor having a control electrode connected to said first output terminal of said matching transformer, a first electrode of a principal electrically conducting channel receiving power, and a second electrode of said principal electrically conducting channel connected to said second output terminal of said matching transformer;
        a step-up converting unit comprising:
            a first diode restricting current flow having an anode and a cathode, said anode being connected to said second output terminal; and
            a first capacitor being disposed between said cathode of said first diode and a reference potential;
        a horizontal screen size adjusting inductor having an input terminal connected to said cathode of said first diode;
    a horizontal driving circuit being driven by a horizontal oscillation frequency signal and generating a second signal;
    a horizontal outputting circuit comprising:
        a switch, said second signal activating said switch, said horizontal outputting circuit receiving said first signal from said horizontal screen size adjusting unit and said second signal, said feedback signal being transmitted from said switch to said pulse width modulation signal generating unit; and
        a second diode restricting current flow having a cathode connected to said horizontal screen size adjusting inductor and an anode connected to the reference potential, said horizontal outputting circuit selectively outputting said first signal to said pulse width modulation signal generating unit in accordance with said second signal;
    a horizontal deflection inductor receiving said first signal, said horizontal deflection inductor horizontally deflecting said electron beam in accordance with said first signal; and
    a last capacitor being coupled in series to said horizontal deflection inductor, said last capacitor correcting a linearity of said screen.

2. The apparatus of claim 1, wherein said last capacitor corresponds to an S correction capacitor.

3. The apparatus of claim 1, said feedback signal being output from said switch of said horizontal outputting circuit in accordance with said first and second signals.

4. The apparatus of claim 1, wherein said first signal outputted to said pulse width modulation signal generating unit from said horizontal outputting circuit corresponds to said feedback signal and is inputted to said pulse width modulation signal generating unit as a control signal.

5. The apparatus of claim 1, said matching transformer outputting a transistor controlling signal through said first output terminal to said control electrode of said first transistor, said first transistor amplifying current in accordance with said transistor controlling signal, the power received by said first electrode of said first transistor corresponding to high voltage power, said step-up converting unit maintaining a back electromotive force generated at said horizontal screen size adjusting inductor.

6. The apparatus of claim 5, wherein said first transistor corresponds to a field effect transistor.

7. The apparatus of claim 5, said first diode corresponding to a backward current cutting-off unit preventing current from flowing backward due to the back electromotive force generated at said horizontal screen size adjusting inductor, said first capacitor corresponding to a charging unit preventing a surge current due to the back electromotive force generated at said horizontal screen size adjusting inductor and smoothing the back electromotive force.

8. The apparatus of claim 7, wherein said backward current cutting-off unit facilitates a flow of current in a first direction and does not facilitate a flow of current in a second direction, said first direction being effectively opposite to said second direction.

9. The apparatus of claim 8, said anode of said first diode having a first voltage, said cathode of said first diode having a second voltage, the second voltage being approximately double the first voltage.

10. The apparatus of claim 5, said anode of said first diode having a first voltage, said cathode of said first diode having a second voltage, the second voltage being approximately double the first voltage.

11. An apparatus, comprising:
   a video display conveying varying visual information to a user, said video display forming a screen having a vertical screen size and a horizontal screen size, said visual information appearing on said screen, and said video display including an electron gun emitting a beam of electrons;
   a signal generating unit receiving a first signal and a feedback signal, generating a second signal in accordance with said first signal and said feedback signal, and outputting said second signal, wherein said first signal corresponds to a horizontal screen size adjusting signal and said second signal corresponds to a pulse width modulation signal;
   an adjusting unit receiving said second signal from said signal generating unit, said adjusting unit being driven by said second signal, said adjusting unit outputting a third signal to adjust said horizontal screen size;
   a driving circuit receiving a fourth signal and generating a fifth signal, said fourth signal corresponding to a horizontal oscillation frequency signal;
   an output unit having a switch selectively turning said output unit on and off, said output unit receiving said third signal from said adjusting unit, said output unit receiving said fith signal from said driving circuit, said fifth signal switching said switch, said output unit selectively discharging a voltage in accordance with said fifth signal, said output unit comprising:
      a first transistor having a control electrode receiving said fifth signal from said driving circuit, a first electrode of a principal electrically conducting channel receiving said third signal from said adjusting unit, and a second electrode of said principal electrically conducting channel, said switch corresponding to said first transistor, said feedback signal being output from said second electrode of said first transistor to said signal generating unit;
      a resistor connecting said second electrode of said first transistor to a reference potential; and
      a diode restricting current flow having a cathode connected to said adjusting unit and an anode connected to the reference potential;
   a first inductor receiving a sixth signal from said output unit, said first inductor deflecting said electron beam in accordance with said sixth signal; and
   a first capacitor being coupled in series to said first inductor, said first capacitor correcting a linearity of said screen; and
   said adjusting unit further comprising:
      a transformer having an input terminal receiving said second signal, a first output terminal, and a second output terminal;
      a second transistor having a control electrode connected to said first output terminal of said transformer, a first electrode of a principal electrically conducting channel receiving a first power, and a second electrode of said principal electrically conducting channel connected to said second output terminal of said transformer;
      a second inductor adjusting said horizontal screen size in accordance with said third signal supplied through said second transistor; and
      a step-up converting unit maintaining a back electromotive force generated at said second inductor, said step-up converting unit comprising:
         a backward current cutting-off unit preventing current from flowing backward due to the back electromotive force generated at said second inductor; and
         a charging unit preventing a surge current due to the back electromotive force generated at said second inductor and smoothing the back electromotive force.

12. The apparatus of claim 11, wherein said first inductor comprises a horizontal deflection inductor.

13. The apparatus of claim 11, wherein said output unit comprises a horizontal outputting circuit.

14. The apparatus of claim 11, wherein said signal generating unit comprises a pulse width modulation signal generating unit.

15. The apparatus of claim 11, wherein said second transistor comprises a field effect transistor.

16. The apparatus of claim 11, wherein said backward current cutting-off unit corresponds to a second diode.

17. A method, comprising:
   conveying varying visual information to a user utilizing a video display forming a screen having a vertical screen size and a horizontal screen size, said visual information appearing on said screen, and said video display including an electron gun emitting a beam of electrons;
   receiving a horizontal screen size adjusting signal and a feedback signal;
   generating a pulse width modulation signal in accordance with said horizontal screen size adjusting signal and said feedback signal;
   receiving said pulse width modulation signal in an adjusting unit comprised of:
      a matching transformer having an input terminal disposed to receive said pulse width modulation signal, a first output terminal, and a second output terminal; and
      a transistor having a control electrode connected to said first output terminal of said matching transformer, a first electrode of a principal electrically conducting channel receiving power, and a second electrode of said principal electrically conducing channel connected to said second output terminal of said matching transformer;
   generating a first signal in accordance with said received pulse width modulation signal to adjust said horizontal screen size;
   preventing current from flowing backward in said adjusting unit due to a back electromotive force generated at a first inductor in said adjusting unit;
   preventing a surge current due to the back electromotive force and smoothing the back electromotive force;
   receiving a horizontal oscillation frequency signal and generating a second signal;
   receiving said first and second signals at an outputting circuit;
   outputting from said outputting circuit a third signal in accordance with said first and second signals;
   switching a switch on and off in accordance with said second signal, said switch being included in said outputting circuit, said switch corresponding to a transistor, said transistor having a control electrode receiving said second signal, a first electrode of a principal electrically conducting channel receiving said first signal, and a second electrode of said principal electrically conducting channel connected to a reference potential through a resistor, said second electrode outputting said feedback signal in accordance with said first and second signals;

outputting from said outputting circuit said feedback signal, in accordance with said first and second signals;

receiving said third signal and deflecting said electron beam in accordance with said third signal, said deflecting being performed by a second inductor; and correcting a linearity of said screen, said correcting being performed by a correcting unit disposed between said second inductor and a reference potential.

18. The method of claim 17, wherein said correcting unit comprises a capacitor.

19. The method of claim 17, wherein said video display comprises a cathode ray tube.

20. The method of claim 17, said preventing of the current from flowing backward being performed by a diode in said adjusting unit, said preventing of the surge current being performed by a capacitor in said adjusting unit, said diode having a cathode connected to said first inductor and to said capacitor.

21. An apparatus, comprising:

a video display conveying varying visual information to a user, said video display forming a screen having a vertical screen size and a horizontal screen size, said visual information appearing on said screen, and said video display including an electron gun emitting a beam of electrons;

a pulse width modulation signal generating unit receiving a horizontal screen size adjusting signal and a feedback signal, and accordingly generating a pulse width modulation signal, said pulse width modulation signal generating unit outputting said pulse width modulation signal;

a horizontal screen size adjusting unit being driven by said pulse width modulation signal and generating a first signal adjusting said horizontal screen size in accordance with a step-up type, said horizontal screen size adjusting unit comprising:

a matching transformer unit, comprising:

a first capacitor having a first terminal receiving said pulse width modulation signal, and having a second terminal;

a transformer having an input terminal coupled to said second terminal of said first capacitor, and having a first output terminal and a second output terminal; and a second capacitor having a first termina coupled to said first output terminal of said transformer, and having a second terminal;

a first transistor having a control electrode connected to said second terminal of said second capacitor, a first electrode of a principal electrically conducting channel receiving power, and a second electrode of said principal electrically conducting channel connected to said second output terminal of said transformer;

a step-up converting unit comprising:

a first diode restricting current flow having an anode and a cathode, said anode being connected to said second output terminal of said transformer; and a third capacitor being disposed between said cathode of said first diode and a reference potential;

a horizontal screen size adjusting inductor having an input terminal connected to said cathode of said first diode;

a horizontal driving circuit being driven by a horizontal oscillation frequency signal and generating a second signal;

a horizontal outputting circuit comprising:

a switch, said second signal activating said switch, said horizontal outputting circuit receiving said first signal from said horizontal screen size adjusting unit and said second signal, said feedback signal being transmitted from said switch to said pulse width modulation signal generating unit; and a second diode restricting current flow having a cathode connected to said horizontal screen size adjusting inductor and an anode connected to the reference potential, said horizontal outputting circuit selectively outputting said first signal to said pulse width modulation signal generating unit in accordance with said second signal;

a horizontal deflection inductor receiving said first signal, said horizontal deflection inductor horizontally deflecting said electron beam in accordance with said first signal; and a last capacitor being coupled in series to said horizontal deflection inductor, said last capacitor correcting a linearity of said screen.

22. The apparatus of claim 21, wherein said last capacitor corresponds to an S correction capacitor.

23. The apparatus of claim 21, said feedback signal being output from said switch of said horizontal outputting circuit in accordance with said first and second signals.

24. The apparatus of claim 21, wherein said first signal outputted to said pulse width modulation signal generating unit from said horizontal outputting circuit corresponds to said feedback signal and is inputted to said pulse width modulation signal generating unit as a control signal.

25. The apparatus of claim 21, said matching transformer unit outputting a transistor controlling signal through said second terminal of said second capacitor to said control electrode of said first transistor, said first transistor amplified current in accordance with said transistor controlling signal, the power received by said first electrode of said first transistor corresponding to high voltage power, said step-up converting unit maintaining a back electromotive force generated at said horizontal screen size adjusting inductor.

26. The apparatus of claim 25, wherein said first transistor corresponds to a field effect transistor.

27. The apparatus of claim 25, said first diode corresponding to a backward current cutting-off unit preventing current from flowing backward due to the back electromotive force generated at said horizontal screen size adjusting inductor, said third capacitor corresponding to a charging unit preventing a surge current due to the back electromotive force generated at said horizontal screen size adjusting inductor and smoothing the back electromotive force.

28. The apparatus of claim 27, wherein said backward current cutting-off unit facilitates a flow of current in a first direction and does not facilitate a flow of current in a second direction, said first direction being effectively opposite to said second direction.

29. The apparatus of claim 28, said anode of said first diode having a first voltage, said cathode of said first diode having a second voltage, the second voltage being approximately double the first voltage.

30. The apparatus of claim 25, said anode of said first diode having a first voltage, said cathode of said first diode having a second voltage, the second voltage being approximately double the first voltage.

* * * * *